UNITED STATES PATENT OFFICE.

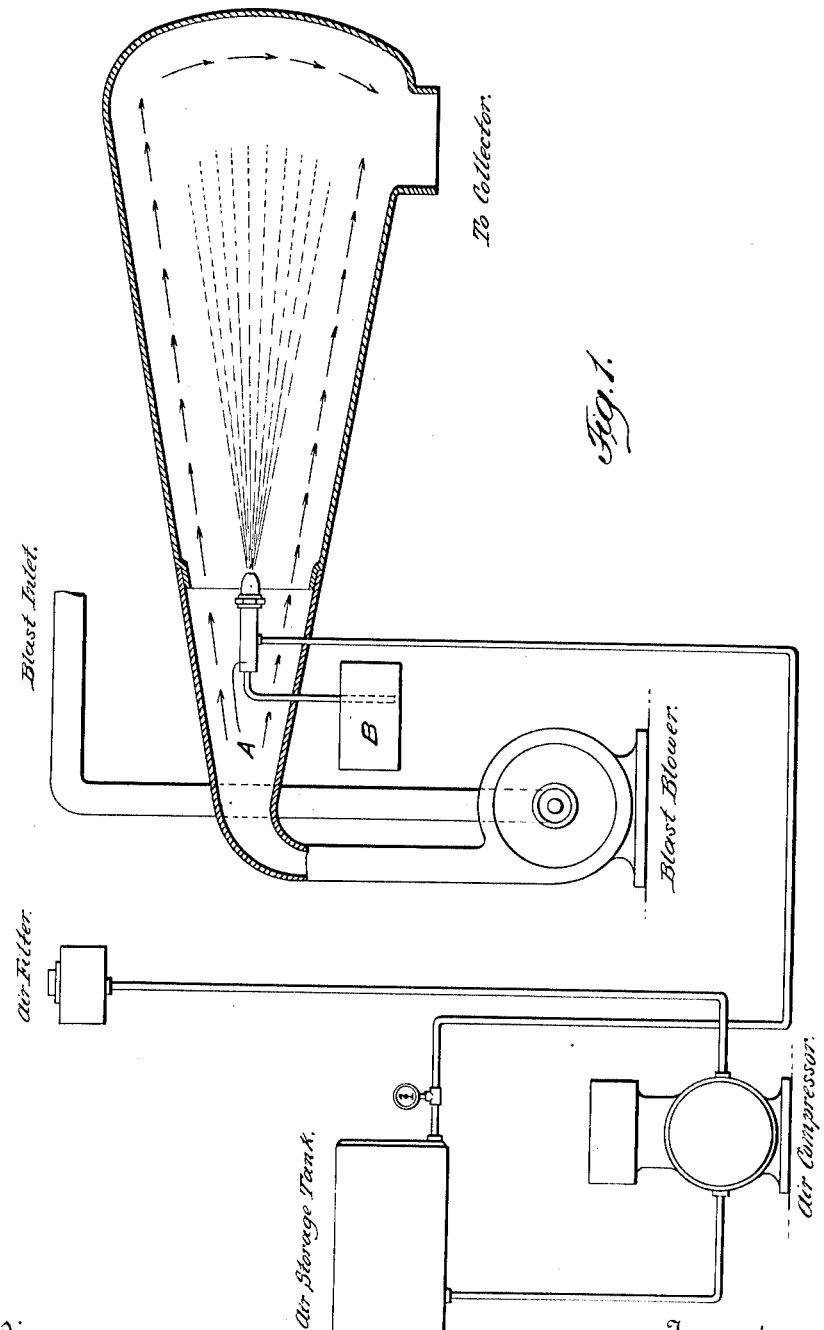

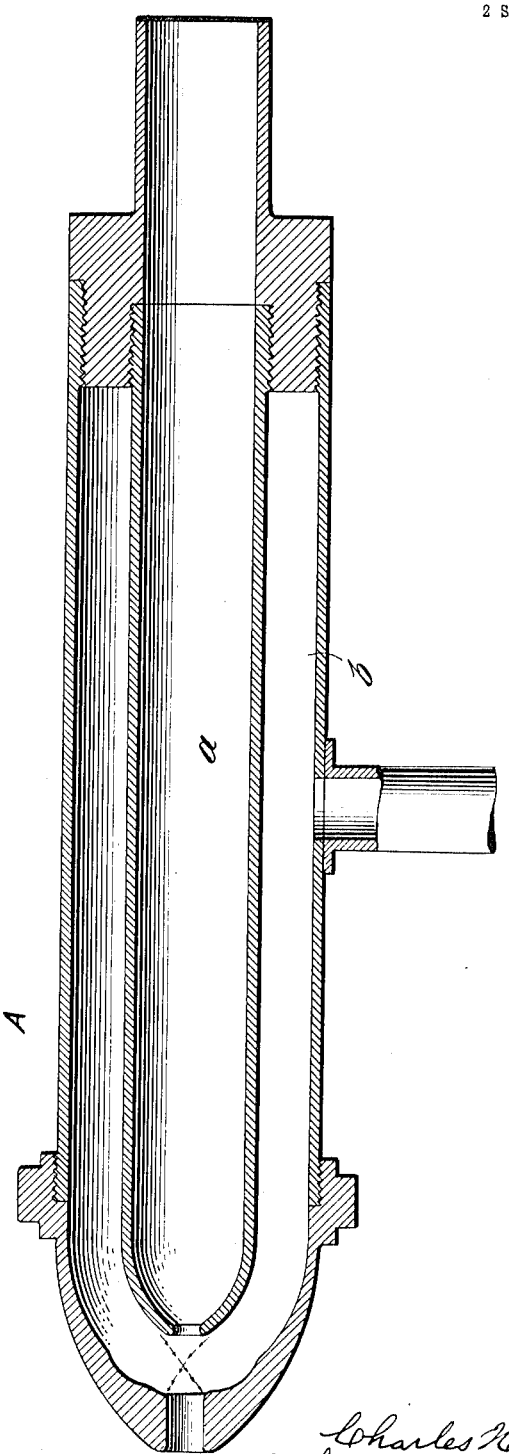

CHARLES H. BRIGHAM, OF BROOKLYN, NEW YORK, ASSIGNOR TO POWDERED MILK COMPANY OF AMERICA, A CORPORATION OF NEW YORK.

DESICCATING PROCESS.

1,071,692.  Specification of Letters Patent.  Patented Sept. 2, 1913.

Application filed February 26, 1910. Serial No. 546,104.

*To all whom it may concern:*

Be it known that I, CHARLES H. BRIGHAM, a citizen of the United States, residing in the borough of Brooklyn, county of Kings, and State of New York, have invented a new and useful Improved Desiccating Process, of which the following is a specification.

The invention relates to an improved process for separating the moisture from the constituent solids of liquids and semi-liquids and recovering the solids in the form of a substantially dry powder which may, by the addition of suitable moisture, be reconstituted into a liquid or semi-liquid possessing all the characteristics of the original.

According to the invention the liquid is put in very finely-divided condition by spraying it (preferably by means of a particularly effective form of nozzle hereinafter described) and in that condition is surrounded by an envelop of air introduced under pressure and moving in the direction of the spray, which envelop of air absorbs the moisture from the liquid. By supplying air under pressure around and in the direction of the spray I am enabled to bring in contact with the liquid or semi-liquid a very large amount of air the power of which to absorb moisture has not been impaired and thus to obtain better results than are otherwise obtained.

The nature of the process is apparent upon an inspection of the accompanying illustrative drawings Figure 1 of which represents diagrammatically an apparatus adapted to the practice of my invention and Fig. 2 a cross-section of the nozzle of the injector or atomizer.

Air, which is preferably filtered by being drawn through an air filter, is compressed in the air compressor and stored in the air storage tank, whence it is conducted in a regulated, constant amount to the injector A. The injector is connected by a pipe to the tank holding the liquid B, which tank may be connected with a larger reservoir. The injector consists of an inner tube *a* for the liquid surrounded by a tube *b* connected with the supply of air under pressure. Both the inner and outer tubes are contracted at the end, as shown in Fig. 2, in such manner that the air between them under pressure creates a partial vacuum near the orifice of the inner tube and draws the liquid therefrom, at the same time forcing it from the orifice through the outer tube, thus effectively spraying it in finely-divided form. Around the spray and moving in the same direction an envelop of air under pressure is supplied in sufficient quantity to absorb the moisture from the liquid, by means preferably of a blast blower, as indicated in the drawing. A blast blower is convenient for this purpose, although it may be accomplished by an air-compressor or by making an additional connection with the compressor supplying air under pressure of the injector. The liquid thus presented in finely-divided form to a constantly-renewed, absorbing envelop of air is effectively dried. The dried product may be collected in any convenient manner.

In the drawing is indicated a chamber of sufficient length to permit of the absorption of the moisture from the liquid and of such shape as to accommodate the spray and surrounding absorbing envelop, but this may obviously be modified. For example, the spray and surrounding envelop may be directed vertically or horizontally and several of them used in a single chamber connected with a common collector if for any reason that is found convenient.

I do not desire to be understood as limiting myself to the precise arrangement shown in the drawings, in carrying out the process the same being merely illustrative and the most advantageous arrangement depending largely on conditions not directly involved in my invention.

The product of my process is superior particularly in the case of milk, to which the invention is particularly applicable.

I am aware that it has been suggested that liquids be sprayed, and I do not broadly claim spraying in itself or spraying and supplying air to the spray.

What I claim is:—

1. The process of obtaining the solid constituents of liquids and semi-liquids in the form of a substantially dry powder, which consists in converting the mass into a fine spray and surrounding the spray with an envelop of forcibly projected air introduced under pressure moving in the same direction with the spray.

2. The process of obtaining the solid constituents of liquids and semi-liquids in the form of a substantially dry powder, which consists in converting the mass into a fine spray and surrounding the spray with a diverging envelop of forcibly projected air introduced under pressure and moving in the same direction with the enveloped spray.

3. The process of obtaining the solid constituents of liquids and semi-liquids in the form of a substantially dry powder, which consists in converting the mass into a fine spray increasing in cross area from a point of projection and surrounding the spray with a diverging envelop of forcibly projected air introduced under pressure and moving in the same direction with the spray.

4. A process of obtaining the solid constituents of liquids and semi-liquids in the form of a substantially dry powder, which comprises converting the liquid into a spray, causing a large amount of drying agent to travel around the spray in the same direction with it in such manner as to present at each point on the path of the spray successive quantities of the drying agent.

CHAS. H. BRIGHAM.

Witnesses:
 HERMAN GUSTOW,
 KATHRYN M. KILEY.